at 160° C. are satisfactory. The treatment can be carried out with advantage under vacuo. A thin gel is obtained. When instead of 5 parts only 3 parts of the above solidified linseed oil is used a viscous liquid is obtained instead of the gel.

*Example 2*

100 parts of refined mineral oil are heated together with 4 parts of linseed oil solidified with the aid of 5 per cent of 2:5-dichlorobenzene sulphonic acid, (obtainable by heating 5 parts of said sulphonic acid with 100 parts of linseed oil under vacuum to 280–310° C.—see Example 3 of Ser. No. 359,425), under vacuo between 230° C. and 240° C. for about 4 hours. A dark oil results, which is thicker than the original mineral oil, is ash-free, and does not show a considerable amount of saponifiable matter.

*Example 3*

100 parts of thin refined mineral oil are heated together with 2 parts of linseed oil solidified with the aid of 5 per cent benzidine base, (obtainable by heating 5 parts of benzidine base with 100 parts of linseed oil under vacuum to 280–300° C.—see Example 1 of Ser. No. 446,170), for 2½ hours at approximately 200° C. The resulting product is thicker than the original oil and does not form an emulsion when stirred with water.

*Example 4*

100 parts of refined mineral oil are heated together with 4 parts of linseed oil solidified by the aid of 5 per cent p-nitroacetanilide, (obtainable by heating 5 parts of p-nitroacetanilide with 100 parts of linseed oil under vacuum to 280–310° C.—see Example 6 of Ser. No. 359,425), at 250° C. The solidified linseed oil product was divided in half; the first half (2 parts) was added, and the mass heated for 2½ hours, followed by the addition of the second half, and heating for a further 1 hour. A thick oil results, which does not emulsify in water.

It is advisable in many cases to exclude air from the reaction, and to carry out the heat treatment under vacuo for this reason. Lower temperatures than 200° C. give also satisfactory results.

Other modified products may be obtained using similar procedures.

What I claim is:

1. In the manufacture of oil products having increased viscosity and body from liquid oils, the process which comprises heating a fatty oil with 2 to 30 percent of an organic sulphonic acid compound of the class consisting of aromatic sulphonic acids, their halides and esters, to temperatures between 100 and 300° C. until said organic sulphonic acid compound is distributed uniformly in said fatty oil, thus producing a greatly modified body, and then distributing said modified body throughout a relatively large amount of a liquid oil to produce said oil product.

2. In the manufacture of modified products having lubricating properties, the process which comprises heating together a fatty oil with an aromatic sulphonic acid, until a greatly modified body is formed, and then admixing and dispersing said modified body in a relatively large amount of mineral oil, thus producing said modified products.

3. The process of claim 2, in which the said aromatic sulphonic acid is 2:5-dichlor-benzene sulphonic acid.

4. In the manufacture of modified products from mineral oils, such products being useful as lubricants, the process which comprises mixing linseed oil with about 5 percent of 2:5 dichlorobenzene sulphonic acid, heating the so treated linseed oil to a temperature between 230° and 240° C. under vacuo until a solidified, modified product is obtained, mixing about 4 parts of said solidified modified product with about 100 parts refined mineral oil, heating the mixture thus obtained for about four hours to produce a modified mineral oil, said modified mineral oil being thicker than the original mineral oil, being ash free and being practically free of saponifiable matter.

5. In the manufacture of modified products from mineral oils, said products being suitable for lubricating purposes, the process which comprises heating together an aromatic sulphonic acid with a fatty oil to produce a modified unsaponifiable product, adding said product to mineral oils to thicken said mineral oils, thus producing said modified products suitable for lubricating purposes.

6. In the manufacture of modified products from mineral oils, said products being suitable for lubricating purposes, the process which comprises heating together an aromatic sulphochloride with a fatty oil to produce a modified unsaponifiable product, adding said product to mineral oils to thicken said mineral oils, thus producing said modified products suitable for lubricating purposes.

7. In the manufacture of compounded mineral oils having increased viscosity and other improved properties, the improvement which comprises dispersing a minor amount of a thickened, non-oxidized, heat-bodied fatty oil in a mineral oil, the said heat-bodied fatty oil containing an organic polar compound dissolved therein.

8. The process of claim 7 wherein said solid, heat-bodied fatty oil contains dispersed therein a solid, metal-free aromatic polar compound, the said heat-bodied fatty oil being obtainable by heat-bodying the fatty oil in the presence of said polar compound in a dry condition.

9. The process of claim 7, wherein said heat-bodied oil contains an organic halogen compound dissolved therein.

10. In the manufacture of compounded mineral oils, useful as lubricants, the improved process which comprises first heat-bodying a fatty oil in the presence of 2 to 30 percent of a dry polar compound to produce a thickened, non-oxidized, heat-bodied fatty oil containing a polar compound dissolved therein and then dispersing a minor amount of said heat-bodied oil containing the polar compound dissolved therein, in a mineral oil, to produce said compounded lubricant.

11. The process of claim 10, wherein said polar compound is an organic compound containing an acidic inorganic residue attached to the organic residue, said organic compound being relatively non-volatile.

12. As a new product, a compounded mineral oil useful as a lubricant for metals, comprising a liquid mineral oil and a thickened, non-oxidized, heat-bodied fatty oil dispersed therein, said heat-bodied fatty oil containing an organic polar compound dissolved therein.

13. The product of claim 12 wherein said fatty oil contains an aromatic sulphonic acid dispersed therein.

14. In the manufacture of improved, compounded oils useful as a lubricant for metals, the improved process which comprises dispersing 2:5- dichlorbenzene sulfonic acid in an oil and then blending that mixture with a relatively large amount of mineral oil to obtain said compounded lubricant containing a minor amount of 2:5-dichlorbenzene sulfonic acid dispersed therein.

15. As a new product a compounded lubricant useful in lubricating metals, said lubricant comprising a major amount of a mineral oil and a relatively small amount of 2:5-dichlorbenzene sulfonic acid, the amount thereof not exceeding 30 per cent on the mineral oil.

LÁSZLÓ AUER.

CERTIFICATE OF CORRECTION.

Patent No. 2,213,943.  September 10, 1940.

LÁSZLÓ AUER.

It is hereby certified that error appears in the printed specification of the above numbered patent requiring correction as follows: Page 1, first column, line 17, for "1936" read --1926--; page 7, second column, line 3, for "a lubricant" read --an improved mineral oil composition--; page 9, first column, line 67, claim 2, strike out the words and syllable "from mineral oils, said products having lubricat-" and insert the same after "products" in line 65, same claim; and that the said Letters Patent should be read with this correction therein that the same may conform to the record of the case in the Patent Office.

Signed and sealed this 22nd day of October, A. D. 1940.

(Seal)

Henry Van Arsdale,
Acting Commissioner of Patents.

Patented Sept. 10, 1940

2,213,944

UNITED STATES PATENT OFFICE 2,213,944

PROCESS FOR COLLOIDAL TRANSFORMATIONS OF ORGANIC ISOCOLLOIDS

László Auer, Budapest, Hungary, assignor to J. Randolph Newman, trustee, Washington, D. C.

No Drawing. Application April 30, 1929, Serial No. 359,425. In Great Britain May 4, 1928

24 Claims. (Cl. 260—407)

In my co-pending application Ser. No. 143,786 a process is described for the modification of the physical properties of natural and artificial isocolloids containing unsaturated carbon compounds by heating them with "electrolytes" (under which term are included salts of inorganic and organic acids, certain organic acids, and metallic derivatives of organic compounds) with or without a simultaneous or subsequent treatment with gases at reduced, ordinary or increased pressure. The products obtained were, from liquids, solid or semisolid thermoplastic masses, and from solids, harder solids or pasty or thin liquids. The products find application in the rubber, linoleum, varnish, soap and candle and other industries.

My present invention also relates to the treatment of isocolloid substances containing unsaturated carbon compounds. By "isocolloid substances" I mean colloidal substances wherein the dispersed phase and the dispersion medium of the colloidal system are both of the same chemical composition, but, of course, in a different physical state (Ostwald: Practical Colloid Chemistry, 1926, page 187).

In these processes, I have found that colloidal transformation plays an important part. By "colloidal transformation" I refer to those changes which take place in the colloid system of the body and which involve an alteration in the number and size of the colloid aggregations (micells), resulting in modification of the physical properties of the body, such as viscosity, melting point, elasticity, etc. (see "Farbenzeitung"—Berlin, 1926, vol. 22 and "Chemische Umschau-Stuttgart, 1926, vol. 18).

I have found that not only the fatty oils, but substances generally which contain unsaturated carbon compounds, are susceptible to those colloidal chemical reactions which involve what I have referred to above as colloidal transformations.

My present application is in part a division and in part a continuation of my above-identified application Serial No. 143,786.

Further investigation has enabled me to indicate some special features of particular series of examples of the main invention, and to add valuable groups of modifying agents which are active in bringing about the changes described.

Thus I have found that in the following series of oils, viz., tung oil, linseed oil, castor oil, fish oils ("train oils"), poppyseed oil, sunflower oil, rapeseed oil, walnut oil, pine oil, corn oil, olive oil, the ease of transformation under equal conditions decreases in the order given; the first mentioned oils are most rapidly attacked and give the hardest final products, whilst the oils at the end of the series are attacked more slowly and give less solid products. It should, however, be mentioned that by employment of suitable modifying agents hard products can be obtained even from the last-mentioned oils. If, for example castor oil is heated for 5 hours at 270–290° C. under an absolute pressure of 1 inch of mercury with 5% of its own weight of sodium bicarbonate a solid product is obtained whereas if olive oil be employed the product has a vaselinelike consistency. If however olive oil is heated under the same conditions with a mixture of 5% of its weight of sodium bicarbonate plus an equal weight of barium peroxide the product approximates to that obtained by heating castor oil with 3% of its weight of sodium bicarbonate alone. Similarly I find that of resins, those of American, French and Spanish origin are more easily liquefied than the Greek resins, though the latter undergo considerable improvement and become suitable for lacquer manufacture. The following reagents, amongst others, are eminently suitable for use in the liquefaction of resins: ammonium iodide, magnesium sulphate, magnesium chloride, zinc carbonate, zinc bromide, sodium sulphide, barium thiocyanate, lead chromate, potassium dichromate, barium sulphide, cadmium sulphide. The liquefaction is preferably carried out by heat treatment of the mixture of resin and reagent in vacuo. Addition of 5% of formic acid to the mixture increases the velocity of dissolution of the reagent with consequent improvement of the resulting product.

These statements in no way limit the application of my invention, and the specific oils mentioned must be regarded each as typical of a class.

Products from fatty oils suitable for the manufacture of lacquers and varnishes are obtained by the process of specification No. 143,786 in particular from tung oil, linseed oil, castor oil, sunflower oil, fish-blubber and the like. Rubber also gives a good base for this purpose, as do in special cases mineral oils, containing naphthenic acids, asphalts and pitches. Resins give valuable lacquer bases by solidification, e. g., if resin is heated with 5% of its own weight of zinc peroxide plus an equal weight of lithium sulphite until the reagents are dissolved, a hardened resin is obtained; and by liquefaction they give substitutes for drying oils for use in oil lacquers, since the liquefied resins have excellent drying properties.

I have further found that the modification of the starting-materials may be effected not only by the substances mentioned in my prior specification, but by all compounds comprising within the molecule an acidic inorganic residue and an organic residue. By an acidic inorganic residue I mean such an inorganic residue as can be converted by the addition of one or more hydrogen atoms into an inorganic acid (including carbonic acid as inorganic). It will be seen that this definition includes such compounds as organic halogen derivatives (e. g., trichloroacetic acid, chloral hydrate, iodoform o-dichlorobenzene, p-dichlorobenzene, trichlorobenzene, mono-chloroacetic acid, 4-chloro-o-anisidine, pinene hydrochloride, naphthalene tetrachloride, p-nitro chloro-benzene, benzyl chloride, triphenyl-chloromethane, acetyl chloride, benzoyl chloride) organic sulphonic acids and their halides and esters (e. g:

Sodium 2:6:8 naphthylaminedisulphonate
Sodium 2:6:8 naphtholdisulphonate
Sodium 1:8:3:6 aminonaphtholdisulphonate
Sodium 1:5 naphtholsulphonate
Sodium 2:3:6 naphtholdisulphonate
Sodium 2:6 naphtholsulphonate
Sodium 2:6 naphthylaminesulphonic acid
Sodium 2:1 naphthylaminesulphonic acid 2-phenylamino-8-naphthol-6-sulphonic acid,
beta-naphthylamine 3:6:8 trisulphonic acid,
beta-naphthol 3:6:8 trisulphonic acid,
beta-naphthol 1:5 disulphonic acid,
naphthalene 2:6 disulphonic acid,
naphthalene 1 sulphonyl chloride,
alpha-naphthyl sulphamic acid,
m-xylidine sulphonic acid,
benzene sulphonic acid,
p-toluene sulphonic acid,
p-toluene sulphonyl chloride,
sulpho salicylic acid,
p-toluidine m-sulphonic acid,
benzene sulphonyl chloride,
2:5 dichlor benzene sulphonic acid,
methyl p-toluene sulphonate,
ethyl chlorsulphonate), esters of inorganic acids (e. g. dimethylsulphate, triphenyl or tricresyl phosphate, nitrocresol carbonates), and inorganic salts of organic bases (e. g., m-nitroaniline hydrochloride, diaminodiphenylamine sulphate, amino-azo-benzene sulphate, diphenylamine sulphate, diphenylamine hydrochloride, diphenylamino hydrobromide, diphenylamine trichloracetate, trichloraniline hydrochloride).

Further examples are o-nitrophenol, p-nitrophenol, p-nitro acetanilide, dinitraniline, fluorosceine, eosin, thiocarbanilide, diamino-diphenyl sulphide, diphenyl sulphone.

The amount of modying agent used according to my invention is normally from 2 to 10% by weight on the starting-materials. I find that the degree of modification of the final product increases as more modifying agent is employed. It is not necessary to use more than 30%, nor in the case of salts is it usually possible to dissolve more than this proportion. With the organic agents it is of course possible to employ larger proportions.

I have observed that those modifying agents are most effective which according to Frumkin's method (see, e. g., Z.physikalische Chemie, 1924, 109, 34–49 and later papers) impart a negative surface charge to a liquid (especially water) in which they are dispersed.

The effectiveness of the modifying agent whether belonging to the "electrolyte" class described in the prior specification or to the new class above mentioned is appreciably greater when it is applied in the colloidal condition, for example by dispersion in the starting-material by means of some form of mill. In the case of rubber the modifying agent may be milled into the rubber in a mixer, heat being applied sufficient to soften the rubber without melting it; e. g., it may be milled at 80° C. and the modifying treatment carried out at temperatures between 100° and 180° C., though these may be temporarily exceeded on account of the exothermic nature of the process. Rubber readily absorbs the modifying agents without melting.

The modifying process may be accelerated, not only by radiations as mentioned in the prior specification, but also by making the mixture of starting-material and electrolyte part of an electric circuit.

By a suitable choice of modifying agents I obtain products which are suitable for manufacture of improved water-fast varnishes and lacquers. For this purpose I choose modifying agents which are substantially insoluble in water, such as tin carbonate, tin sulphite, tin sulphide, antimony sulphide, zinc sulphide, barium sulphide, barium carbonate, calcium sulphite, strontium sulphite, magnesium sulphite, barium sulphite, lead sulphite, cadmium sulphite, cadmium sulphide, mercuric sulphate, and the like. Some of these are very difficultly soluble in the starting-material, and in such cases it is advantageous to produce the modifying agent in situ. This barium sulphate is very insoluble in linseed oil, whilst magnesium sulphate and barium peroxide are easily soluble; I therefore dissolve these two substances in the linseed oil and produce within the oil the insoluble modifying agent, barium sulphate. By using zinc carbonate and barium peroxide in this way I produce in the oil barium carbonate and zinc oxide, both insoluble in water, and the product subsequently obtained gives an excellent, water-fast varnish.

I have found that the use of oxygen-generating substances, e. g., peroxides, and especially peroxides of metals giving water-insoluble compounds when combined with the anion of the modifying agent used, is particularly suitable for the production of varnish bases by my invention: the oxygen gas treatment which results from this procedure seems to have special value for this purpose. The following examples amongst others illustrate this feature. Zinc carbonate in conjunction with one of the following: bismuth peroxide, manganese peroxide, nickel peroxide, zinc peroxide, strontium peroxide, cerium peroxide; mercuric carbonate with barium peroxide or magnesium peroxide; lead carbonate with barium peroxide.

It is obvious that this form of my invention applies not only to the production of solid varnish bases from liquid oils, but also to the conversion or partial conversion of solid or semi-solid resins into liquids for use in varnishes. While, e. g., magnesium sulphate, sodium sulphide, ammonium iodide, magnesium carbonate, zinc carbonate, and lead chromate all give excellent varnish materials from resins, the last three (and other water-insoluble modifying agents) are superior in that the products made with their help may be employed for water-fast varnishes. Naturally, other constituents present in the varnish also influence its fastness to water.

It will be convenient to refer in this specification to the products obtained by my process for the modification of oils as "oil-products", and to those obtained similarly from resins as "resin-products".

By the vulcanisation of oil-products and resin products I have obtained substances which yield new types of lacquers and varnishes. Various combinations of vulcanised and unvulcanised oil products and resin products may be used. For instance, a resin product may be vulcanised and used with an unvulcanised oil product; a vulcanised oil product may be used with an unvulcanised resin product; a mixture of an oil product and a resin product may be vulcanised together, or a solution of such a mixture in a suitable solvent may be treated with a vulcanising agent. For the vulcanisation sulphur, sulphur chloride or other reagents for introduction of sulphur may be used; with sulphur chloride vulcanisation occurs in the cold, and this reagent is also suitable for the vulcanisation of solutions of the oil-products or resin-products. The injurious action of free hydrogen chloride evolved when sulphur chloride is used must be prevented by addition of neutralising agents or other suitable means. For instance an inorganic oxide or hydroxide, e. g., calcium oxide or calcium hydroxide, or an organic amine may be mixed into the modified oil or resin products before vulcanisation. Or such neutralising agents may be added to the vulcanising agent prior to its use. In some cases the vulcanisation may be effected prior to the addition of the neutralising agent. In such cases also the above mentioned agents may be used or the addition of an unsaturated organic substance such as turpentine oil may be found advantageous. The injurious effects of the free hydrogen chloride may also be prevented by passing a gas through the pulverised vulcanised product or through its solution in a suitable solvent either alone or admixed with or saturated with the vapours of volatile basic substances such as ammonia or trimethylamine or with volatile insaturated hydrocarbons.

Accelerators (such as piperidine pentamethylenedithiocarbamate, tetramethylthiuram disulphide, heptaldehydeaniline, mercaptobenzthiazole), and antioxidants (such as p-aminophenol, hydroquinone, compounds obtained by condensing alpha and beta naphthylamines or mixtures of these bodies with aldehydes (see U. S. Patent No. 1,777,352)) may be added if desired. Such additions are included in my prior specification as "purely organic bodies." Activators such as zinc oxide may also be added.

The vulcanised products are valuable for varnishes and lacquers, giving films which are very elastic, fast to weathering, and suitable for stoving. After stoving they exhibit a high degree of resilience and hardness. The character of the varnishes and lacquers may be varied by varying the temperature of vulcanisation, the proportion of sulphur, the nature and quantity of accelerator and activator, and further by the addition of fillers; e. g. when gas black is applied as a filler the aging properties of the varnish films are improved accordingly.

I have further discovered that the dissolution of the "electrolytes" or other modifying agents in the starting-materials is very appreciably facilitated by the addition of certain "auxiliary agents" or "sensitisers." These fall into two groups, namely, the purely inorganic (e. g., silica gel, fuller's earth), and the purely organic (e. g., formaldehyde, phenol, thiocarbanilide, benzidine, hexamethylenetetramine, 2:3 hydroxynaphthoic acid, alpha-naphthol, quinoline, pyrogallol, benzene, glycerol and phthalamide). The specific examples of auxiliary agents here mentioned are to be taken as typical of the substances which have been successfully used for this purpose and not as comprising all the effective substances. It should be mentioned that some electrolytes, and quite a number of the new modifying agents disclosed in the present specification act as auxiliary agents (sensitisers) when used in conjunction with other modifying agents. Thus, e. g., the dissolution of 5% of sodium bisulphite in linseed oil is facilitated and the colour of the product is made lighter by the addition of say 2% of such compounds as amino-azobenzene sulphate, aniline sulphate, nitrocresyl carbonate, dimethyl sulphate, trichloroacetic acid, benzenesulphonic acid, iodoform, naphthalene tetrachloride, pinene hydrochloride, m-xylidinesulphonic acid, β-naphthylamine-6:8-disulphonic acid, β-naphthylamine 6-sulphonic acid, acetyl chloride, p-nitroacetanilide, chloral hydrate, and triphenyl phosphate. Naphthalene 1 sulphochloride, oxalic acid, diphenylamine hydrobromide, amino salicylic acid, pale cresylic acid, 2:6 naphthalene disulpho acid, o-dichlorbenzene.

The advantages of a rapid dissolution of the modifying agent are greatest in those cases where a clear, pale or colourless product is desired, especially for example, for the varnish industry. They are also important in the manufacture of oil products for the rubber industry, and are very manifest in the case of fatty oils to be treated with metal organic salts, carbonates, sulphides, sulphites, hydrosulphites, thiosulphates, or halides.

Plasticisers may be added to the starting-materials, or during or after the process of modification, in order to obtain a softer final product. These plasticisers may be purely organic (e. g. glycerol, phenol) or partly organic and partly inorganic (e. g. tricresyl phosphate).

The following examples are given by way of illustration of various aspects of the invention and as indicating various methods of carrying it into effect:

*Example No. 1*

300 parts of resin are heated with 20–30 parts by weight of zinc carbonate and 5 parts by weight of formic acid under a vacuum of 25–30 inches of mercury for 10–12 hours at 270–280° C. The product is a very viscous oil which can be used in the varnish industry as a substitute for a drying oil, especially suitable for the manufacture of water-fast varnishes. The addition of the formic acid serves to accelerate somewhat the dissolution of the reagent.

*Example No. 2*

300 parts of linseed oil are heated to 290–310° C. in vacuum for 5 hours with 30 parts of triphenyl chlormethane. The product is a medium viscous oil, suitable for lacquer manufacture.

*Example No. 3*

150 parts of linseed oil are heated in vacuum to 280–310° C. for 5 hours with 7½ parts of 2:5 dichlorbenzene sulphonic acid. A soft solid product is obtained, suitable for use as a base for the manufacture of varnishes.

*Example No. 4*

300 parts of linseed oil are heated in vacuum with 15 parts of triphenyl phosphate exactly as